October 17, 1913.

DRAWING 8,416

A careful search has been made this day for the original drawing or a photolithographic copy of the same, for the purpose of reproducing the said drawing to form a part of this book, but at this time nothing can be found from which a reproduction can be made.

Finis D. Morris,
Chief of Division E.

AWK

UNITED STATES PATENT OFFICE.

SPENCER LEWIS, OF ROCHESTER, NEW YORK.

MACHINE FOR CUTTING SCREWS ON RAILS OF BEDSTEADS.

Specification of Letters Patent No. 8,416, dated October 7, 1851.

*To all whom it may concern:*

Be it known that I, SPENCER LEWIS, of Rochester, in the county of Monroe and State of New York, have invented a certain new and useful improvement, being a self-locking, self-reversing hand implement for cutting right and left handed screws on tenons of bedstead-rails; and I do hereby declare the following to be a full, clear, and exact description of the construction and operation thereof, reference being had to the accompanying drawings, forming part of this specification.

In the drawings, Figure 1, is a view of the implement showing it attachment to the bedstead rail, and the position of the reversible cylinder, after the commencement of cutting the right-handed screw. Fig. 2, is a sectional view of the implement—the cylinder having been reversed in position to cut the left handed screw—and being only partly shown in section in order to show the left V shaped cutter. Fig. 3, is a sectional view, showing the combined screw shafts, one of the locking screw shanks, and the cross head of the reversible cylinder, in the position when the implement is to be attached to the rail. Fig. 4, is an end view of the reversible cylinder, and cross head, showing the semi-circular plate for actuating the spring levers in locking and unlocking the screw shanks to the rail. Fig. 5, is a cross section of the reversible cylinder, showing the manner of confining the V shaped cutters thereto. Fig. 6, is a detached perspective view of the V shaped cutter, with its segmental brace plate, and confining screw. Fig. 7, shows one of the boxes of the arms I.

When the same letters of reference occur on the above figures they indicate the same parts.

The nature of my invention consists in constructing a hand implement for cutting right and left-handed screws on tenons of bedstead rails; said implement consisting of a reversible cylinder provided at either end, on the opposing sides therof with a V shaped cutter, each confined in a peculiar manner. Also in having locking and unlocking screw shanks made to slide horizontally in the ends of arms which embrace the end of the rail and securely hold the implement thereto during the operation of cutting the right or left screw. And likewise in having a central screw shaft projecting from the cross head of the reversible cylinder, [to the end of which the power to rotate said cylinder is applied,] surrounded by a hollow shaft provided with an inverse and male screw-thread, and inclosing the latter with a cylindrical or other shaped case having an inverse screw thread matching with the male screw thread of the hollow screw shaft, the whole composing a self-reversing self-locking and unlocking implement for cutting the right and left screw by an alternate reverse rotation, and position of the cylinder, the implement being adaptable to both ends of the rail alike.

To enable others to construct and use my invention I will proceed to describe its construction and operation.

The cylinder A containing the right and left V cutters P, is about three and a half inches long, its interior diameter being equal to the diameter of the tenon of the rail, open at both ends, and suspended at the middle of its length to two screw bolts (*a a*) confined in the ends of two arms B, B, projecting parallel to the axis of the cylinder from either extremity of a cross head C, on the end of the central longitudinal screw shaft D. Inclosing this central screw shaft D, and about two thirds the length of the same there is a hollow shaft E, having an inverse screw thread matching with the thread of the central screw shaft D, and having a male screw thread matching with an inverse screw thread formed on the interior of a cylindrical or other shaped case F. Surrounding the central and hollow screw shafts D, E, and forming the handle of the implement which is somewhat greater in length than the hollow screw shaft E.

The central screw shaft D, and hollow screw shaft E, are respectively made to move toward and from the rail by simply imparting to the cylinder (through the central shaft D) a right or leftward rotation in the following manner.

In cutting a right handed screw, the hollow screw shaft E, is confined to the cylindrical case F, by means of a bolt (*c*) attached to the end of a spring plate G, (secured to the exterior of said case F) and projecting through said case into a hole (*e*) in the hollow shaft E near its inner end, and thus allow the central screw shaft D, to move the cylinder A, over the tenon during the rightward rotation thereof.

In cutting a left handed screw the bolt (c) is withdrawn from the hollow screw shaft E, and simultaneously said hollow screw shaft E, is confined to the central screw shaft D, by means of a bolt (b) (attached to a spring plate f secured to the cross head C) passing into a notch (i) in the end of the hollow screw shaft E, as seen in Fig. 2, and thus the two shafts D, E are caused to move together during the leftward rotation of the cylinder. The bolt (c) is disconnected from the hollow screw shaft E, on the receding movement of the cylinder by means of a cam H, Fig. 4, on the cross head C, which strikes against the end of the spring plate G, and presses the latter with its bolt (c) outward and allows the hollow shaft E, to turn.

The receding movement of the hollow shaft E, after the left-handed screw shall have been cut on the tenon, is arrested by means of a shoulder (g) on the inside of the case F, after it shall have cleared the bolt (b) of the cross head C. From the inner end of the cylindrical case F, project two right-angled arms I, I, of the requisite length to embrace the end of the rail, the ends thereof forming boxes from two to three inches in length within which are confined short screw shanks J, J, each provided with a toothed wheel K, K, which match to cogged or ribbed plates L, L, forming one of the sides to each box, for the purpose of feeding said screw shanks J into, and withdrawing them from the rail, by the rotation of the toothed wheels K, K, during their movement in the boxes toward or from the cylinder. The outer ends of these short screw shanks J, fit into inverse screws in plates (d) which are connected to other plates k, k, by bars (n n) fitting grooves (m m) formed in the sides of each box the length thereof. The inner ends of the shanks are made pointed, and provided with screw threads for the purpose of taking hold of the rail; and are supported by the plates k, k, through which they project, thus it will be seen that the screw shanks J, have a compound movement, rotary and lengthwise in either direction in the boxes, in locking and unlocking the implement to the rail—thus when the screw shanks J with their plates d k are at the extremity of each box as seen in Fig. 3, the inner ends of the shanks which are pointed will be withdrawn from the rail and when the screw shanks J, with their plates are moved toward the cylinder the toothed wheels K, K, in traveling over the cogged or ribbed plates L, will force the pointed ends of the screw shanks into the rail as seen in Fig. 2. The movement of the screw shanks with their plates toward the front ends of the boxes is governed by projecting lips $f^2$ at the ends of said boxes against which the inner plates k, k, strike. The inner ends of these plates k are provided with shoulders $k^2$ $k^2$ against which the shoulder of the tenon strikes in securing the implement to the rail and by which the receding movement of the screw shanks J in the boxes is effected as represented in Fig. 2—their frontward movement after the screw shall have been cut, on the tenon being effected by simply drawing the implement from the rail.

M, M, are two spring levers arranged on the inside of the arms I, and having their fulcra at N, the front ends of said levers extending to the boxes and provided with pins 2, 2, which fit into holes in the plates k k when the implement is properly adjusted to the rail, by which the screw shanks are locked during the operation of cutting the right or left-handed screw as shown in Fig. 2. The inner ends of these spring levers M extend inward as far as the arms I, and are bent at right-angles and provided with plates l l having convex surfaces. See Fig. 4. The object of these spring levers is to lock and unlock the plates k k of the screw shanks J, before and after the cutting of the screw on the tenon. This is effected by means of a semi-circular plate O, attached to the end of a holding lever Q attached to one of the arms of the cross head C, and rotating therewith, thus when the cylinder is at the extreme of its receding movement as shown in Fig. 3, the ends of the semi-circular plate O, are made to catch over the convex plates l l on the bent ends of the spring levers M and draw their inner ends inward and withdraw the pins 2 2 from the holes in the plates k and allow the screw-shanks J to turn on their axes, and free themselves from the rail while the implement is being drawn forward, and the screw-shanks retaining their same position relatively with the rail. The levers M are held in a locked position while cutting the screw by spring plates (o o) which press against the arms I, I, and force the frontward ends of the levers M inward with their pins 2, 2, into the holes of the plates k, k, when their inner ends shall have been relieved from the semi-circular plate O, of the cross-head C. The holding lever Q to which the semi-circular plate O, is attached has its fulcrum in the arm B, of the cross-head C, and is for the purpose of securing the cylinder A while cutting the right or left handed screw by means of a bolt (q) projecting from the end of said lever Q, through the arm B, into an opening in either end of the cylinder A, said lever Q being held when locked to the cylinder by a spring (r) attached thereto and pressing against the end of the cross-head. P, P, are the V shaped cutters made of steel and secured in either end of the reversible cylinder, and on opposite sides thereof in such a manner as to cut the right and left handed screws.

The cutting end of each cutter P, is made to project through an opening (s) Fig. 5 in the cylinder and above the convex surface thereof at the point ($s^2$) and having its shank reduced in size and extending on the inner periphery of the cylinder and projecting through an opening ($s^3$) Fig. 5 therein slightly larger than the shank to allow of its adjustment. The shank is also provided with notches (3 3) on the opposing sides thereof for receiving the notched end of the segmental brace plate R extending over the cylinder and fitting accurately against the shoulder ($s^2$) of the front end of the cutter P which in addition to the confining screw bolt S, passing through the segmental brace plate R, into the cylinder and pressing upon the upper side of the shank of the cutter forms a firm lock thereto, and renders it impossible to remove the cutter without fracturing the segmental plate R, and displacing the confining screw S.

The curvature of the segmental brace plate R is somewhat greater than the convexity of the cylinder, so that when it is confined between the shoulder ($s^2$) and notched end of the cutter, the screw bolt in securing it will have the effect of expanding the segmental plate R, which in connection with the pressure of the screw bolt S, upon the shank of the cutter P, secures the latter firmly.

There is a binding pressure at four points upon the cutter, viz., at either extremity thereof, at the connection of the brace plate R with the frontward end of the cutter P, and at the center by the confining screw bolt S. The upper corners of the front end of each cutter P, is made sufficiently thick to resist the pressure against that portion of the cylinder which it fits. By this mode of fastening the cutters they may be detached from the cylinder with great facility. The ends of the boxes of the arms I, I, are beveled or pointed so as to avoid interfering with the shoulder of the rail in attaching the implement thereto.

Operation: The rail being clamped to a bench in any convenient manner, and the implement set in the position seen in Fig. 3,—with the right V shaped screw cutter P in its position, and the screw shanks J, J, with their plate $d$ $k$ at the frontward ends of the boxes,—the spring levers M held in an unlocked position by the semi-circular plate O,—and the bolt ($e$) of the spring plate C withdrawn from the hollow shaft E,—the implement is them adjusted with the projections $k^2$ $k^2$ of the plates $k$ $k$ against the shoulder of the rail, and is forced horizontally thereon 'till the plates $k$ $k$ shall have reached the extreme of their movement, or the inner ends of the boxes, as seen in Fig. 1, and the end of the tenon resting against the V shaped cutter;—during which movement of the implement the screw shanks J J will have entered the rail, by the rotation of the toothed wheels K, K, over the ribbed plates L, which impart to said screw shanks by means of the inverse screws in the plates ($d$) a movement toward the rail. At thi movement the operator, by means of an ordinary brace or bit stock attached to the square end of the central screw shaft D, turns the latter rightward and relieves the inner ends of the spring levers M from the semi-circular plate O, and at the same moment allows the pins 2 2 of their frontward ends to lock themselves with the plates $k$, $k$, and hold the screw shanks securely to the rail. Simultaneously with this movement the cam H is relieved from the spring plate G, and the bolt ($c$) enters the hole ($e$) in the hollow shaft E, and locks the latter with the case F, and allows the central screw shaft D to move frontward during the rotation of the cylinder A, and feed the V cutter regularly over the tenon until the required right handed screw shall have been cut thereon.

The operator now reverses the rotation of the cylinder until it reaches the extreme of its receding movement, when the semi-circular plate O, acts upon the spring levers M, and unlocks their frontward ends from the plates $k$ $k$. The implement is then drawn toward the operator and at the same time the toothed wheels K, K, (remaining in the same position with the end of the rail) are rotated by the movement of the ribbed plates L, L, so as to withdraw the ends of the screw shanks J from the rail, and allow the implement to pass therefrom. In this position the implement is attached to the opposite end of the rail and locked in the same manner above described—the bolt ($c$) of the spring plate G, being unlocked from the hollow shaft E, by the cam H. The operator having previously detached the bolt ($q$) of the holding lever Q from the cylinder A, and reversed said cylinder end for end to bring the left V shaped cutter in position to cut the left screw on the tenon. The operator then rotates the cylinder leftward and at the same time relieves the spring levers M, from the semi-circular plate O, and locks the implement to the rail—and simultaneously therewith locks the bolt ($b$) of the cross-head C, with the hollow shaft E, and thus the leftward rotation of the cylinder is continued and the hollow screw shaft E made to feed the same over the tenon until the left-handed screw shall have been cut. The rotation of the cylinder is then reversed until the cylinder reaches the terminus of its receding movement—the spring levers M are then unlocked and the implement withdrawn from the end of the rail. In this manner right and left handed screws are cut upon tenons by simply reversing the cylinder longitudinally with its right and left V shaped cutters as required and rotating the cylinder A right or left. The arms I, I, are made sufficiently elastic to accommodate themselves to different sized rails.

Having thus fully described the construction and operation of my hand implement for cutting right and left handed screws on tenons of bedstead rails, I claim—

1. In combination with the central screw shaft D through which the rotation of the cylinder A is effected, the hollow screw shaft E, provided with an inverse and male screw thread, and cylindrical case F, having an inverse screw thread matching with the male screw thread of the hollow shaft E,— the whole being arranged as above set forth, and operated by means of the bolts ($c$ and $b$ and cam H, on the cross head, in such a manner as to feed the cylinder A frontward simultaneously with a right or leftward rotation thereof, as fully described and shown in the drawings.

2. I also claim the employment of the screw shanks J, J, provided with toothed wheels K, K, made to match with toothed or ribbed plates L, L, forming one of the sides of each box,—the outer ends of said screw shanks J, J, being confined in inverse screws formed in plates $d$ $d$, while their inner or pointed ends are supported by plates $k$ $k$ having projections $k^2$ $k^2$ against which the shoulder of the rail acts, for the purpose of actuating said screw shanks rotarily for imparting thereto a lateral movement in such a manner as to cause their pointed ends to enter the rail and be locked thereto by the spring levers M,—said screw shanks J being detached from the rail when unlocked by simply withdrawing the implement therefrom as fully described and shown in Figs. 2 and 3.

3. I further claim the employment of the semi-circular ring O, of the cross-head C, in combination with the spring levers M, M, for the purpose of actuating said spring levers M in locking and unlocking the plates $k$ $k$ of the screw shanks J, J, at the terminus of the receding movement of the cylinder A, whether cutting the right or left screw as described and represented.

4. I also claim confining each V shaped cutter P, to the reversible cylinder A by means of the segmental brace plate R, notched at one end so as to interlock with the end of the shank of the cutter projecting through an opening ($s^3$ in the cylinder, while its opposite end is made to fit against the frontward portion of the cutter $s^2$,— said segmental brace plate R being secured by means of a screw bolt S, passing through it and the cylinder, and pressing upon the shank of the cutter P in such a manner as to form a complete lock thereto,—there being a binding pressure at four points upon the cutter, viz—at either extremity thereof, at the connection of the brace plate R with the frontward end of the cutter, and the center by the confining screw bolt S,—thus rendering it impossible to move the cutter without fracturing the segmental brace plate R, and displacing the screw bolt S, as described and represented.

In testimony whereof I have hereunto signed my name before two subscribing witnesses.

S. LEWIS.

Witnesses:
Wm. P. Elliot,
A. E. H. Johnson.